US006124245A

United States Patent [19]

Patel

[11] Patent Number: 6,124,245

[45] Date of Patent: Sep. 26, 2000

[54] DRILLING FLUID ADDITIVE AND PROCESS THEREWITH

[75] Inventor: Bharat B. Patel, Bartlesville, Okla.

[73] Assignee: Phillips Petroleum Company, Bartlesville, Okla.

[21] Appl. No.: 09/168,268

[22] Filed: Oct. 7, 1998

[51] Int. Cl.[7] ..................... C09K 7/02

[52] U.S. Cl. .................. 507/120; 507/123; 507/145; 507/222; 507/225; 507/229; 507/277; 523/130

[58] Field of Search .................. 507/120, 123, 507/222, 225, 229, 145, 277; 523/130

[56] References Cited

U.S. PATENT DOCUMENTS

| | | | |
|---|---|---|---|
| 3,818,998 | 6/1974 | Hessert | 175/72 |
| 4,024,040 | 5/1977 | Phalangas et al. | 204/159.22 |
| 4,048,077 | 9/1977 | Engelhardt et al. | 252/8.5 C |
| 4,107,057 | 8/1978 | Dill et al. | 252/8.55 C |
| 4,293,427 | 10/1981 | Lucas et al. | 252/8.5 C |
| 4,425,241 | 1/1984 | Swanson | 252/8.5 C |
| 4,455,240 | 6/1984 | Costello | 252/8.5 C |
| 4,547,299 | 10/1985 | Lucas | 252/8.5 C |
| 4,554,081 | 11/1985 | Borchardt | 252/8.5 A |
| 4,561,985 | 12/1985 | Glass, Jr. | 252/8.5 A |
| 4,578,201 | 3/1986 | Burns et al. | 507/123 |
| 4,589,489 | 5/1986 | Volz et al. | 166/274 |
| 4,622,373 | 11/1986 | Bardoliwalla | 526/240 |
| 4,644,020 | 2/1987 | Stahl | 507/123 |
| 4,726,906 | 2/1988 | Chen et al. | 252/8.514 |
| 4,741,843 | 5/1988 | Garvey et al. | 252/8.514 |
| 4,743,383 | 5/1988 | Stewart et al. | 252/8.51 |
| 4,770,795 | 9/1988 | Giddings et al. | 252/8.514 |
| 5,035,812 | 7/1991 | Aignesberger et al. | 507/123 |
| 5,045,588 | 9/1991 | Arranaga | 524/445 |
| 5,134,118 | 7/1992 | Patel et al. | 507/121 |
| 5,135,909 | 8/1992 | Stephens et al. | 507/121 |
| 5,326,854 | 7/1994 | Stahl et al. | 528/488 |
| 5,382,371 | 1/1995 | Stahl et al. | 507/123 |
| 5,620,947 | 4/1997 | Elward-Berry | 507/229 |

*Primary Examiner*—Philip Tucker
*Attorney, Agent, or Firm*—Kameron D. Kelly; Lucas K. Shay

[57] ABSTRACT

A composition is provided which comprises a polymer comprising repeat units derived from an unsaturated amide, an N-vinyl lactam, and optionally, a vinyl acid. Also provided is a water-based fluid composition which can be used as drilling fluid wherein the composition comprises calcium chloride and the polymer. Further providing is a process for using a water-based fluid wherein the process comprises contacting a subterranean formation with the water-based fluid composition disclosed above to effect the control of fluid loss of the water-based fluid composition.

12 Claims, No Drawings

DRILLING FLUID ADDITIVE AND PROCESS THEREWITH

FIELD OF THE INVENTION

The present invention relates to a fluid additive composition comprising a polymer and a process for using the composition in a water-based fluid in a subterranean formation.

BACKGROUND OF THE INVENTION

Water-based fluids such as, for example, drilling fluids, milling fluids, mining fluids, water-based metal working fluids, food additives and water-based paints, are useful in a variety of industrial applications. It is well known to those skilled in the art of drilling wells to tap subterranean deposits of natural resources, such as gas, geothermal steam or oil, especially when drilling by the rotary method or the percussion method wherein cuttings must be removed from the bore hole, it is necessary to use a drilling fluid.

The use of water-based fluids in, for example, workover and completion fluids in oil field operations is also well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Additionally, many additives for water-based fluids were found to effectively provide fluid loss control, increase viscosity, inhibit drill solids, or combinations of two or more thereof, of the water-based fluids when the fluids are used in drilling a subterranean formation and contain little or no calcium chloride. However, as the calcium chloride concentration increases in the fluids, the effectiveness of these additives, especially for maintaining rheology and water loss control, decreases significantly. It is, therefore, highly desirable to develop an imnproved water-based fluid, or an additive thereof, and a process for using these fluids or additives.

SUMMARY OF THE INVENTION

An object of the present invention is to provide an additive composition useful in a water-based fluid. Another object of the invention is to provide a water-based fluid for use as drilling fluid. Still another object of the invention is to provide a composition which can be used as drilling fluid wherein the drilling fluid contains at least 1,000, preferably 5,000, more preferably 10,000, even more preferably, 25,000, and most preferably 50,000 mg/l of calcium chloride. An advantage of the present invention is that the additive of the invention provides a better filtration control in a water-based fluid containing calcium chloride as compared to other known additives. Other objects, advantages, and features will become more apparent as the invention is more fully disclosed hereinbelow.

According to a first embodiment of the present invention, an additive composition is provided which comprises a polymer comprising repeat units derived from an unsaturated amide, a vinyl lactam, and optionally a vinyl acid, wherein the polymer is present in a sufficient amount to effect the control of fluid loss of a water-based fluid comprising the composition.

According to a second embodiment of the present invention, a water-based fluid composition which can be used as drilling fluid is provided wherein the composition comprises water, calcium chloride, and a polymer which is the same as that disclosed in the first embodiment of the invention and wherein the polymer and calcium chloride are each present in a sufficient amount to effect the control of fluid loss of the water-based fluid composition.

According to a third embodiment of the present invention, a process for using a water-based fluid in a subterranean formation is provided. The process comprises contacting the formation with a water-based fluid composition comprising water, a polymer, and optionally calcium chloride wherein the polymer is the same as that disclosed in the first embodiment of the invention and is present in a sufficient amount to effect the control of fluid loss of the water-based fluid composition.

DETAILED DESCRIPTION OF THE INVENTION

According to the first embodiment of the invention, an additive composition is provided. The additive composition comprises, consists essentially of, or consist of a polymer which can comprise, consist essentially of, or consist of repeat units derived from at least two monomers, an unsaturated amide and a vinyl lactam. The polymer can also comprise, consist essentially of, or consist of an unsaturated amide, a vinyl lactam, and a vinyl acid. The term "polymer" used herein denotes, unless otherwise indicated, a copolymer, a terpolymer, a tetrapolymer, or combinations of any two or more thereof.

Suitable unsaturated amide has a general formula of $(R)(R)C{=}C(R){-}(Y)_m{-}C(O){-}N(R)(R)$ where each R can be the same or different and is each selected from the group consisting of hydrogen, alkyl radicals, aryl radicals, aralkyl radicals, alkalkyl radicals, cycloalkyl radicals, and combinations of two or more thereof wherein each radical can contain 1 to about 12 carbon atoms. Y is an alkylene radical having 1 to about 10, preferably 1 to about 7, and most preferably 1 to 4 carbon atoms and can contain substituents selected from the group consisting of hydroxy group, halides, amino groups, alkyl radicals, aryl radicals, alkaryl radicals, aralkyl radicals, cycloalkyl radicals, and combinations of any two or more thereof wherein each carbon-containing radical has 1 to about 12 carbon atoms and m is 0 or 1. Examples of unsaturated amides include, but are not limited to, acrylamide, propenyl amide, 1-butenyl amide, isobutenyl amide, methacrylamide, N-methylacrylamide, N,N-dimethylacrylamide, N-ethylacrylamide, N-ethylacrylamide, N-4-butylphenylacrylamide, flmaramide, 2-acrylamido-2-methylpropane dimethylammonium, and combinations of two or more thereof.

Suitable vinyl lactam has the formula of

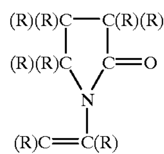

where each R can be the same or different and is the same as that disclosed above. Examples of suitable vinyl lactams include, but are not limited to, N-vinyl-2-pyrrolidone, N-vinyl-2-methylpyrrolidone, N-vinyl-2-ethylpyrrolidone, N-vinyl-2-propylpyrrolidone, N-vinyl-3-pyrrolidone, N-vinyl-2-methylpyrrolidone, and combinations of two or more thereof. The presently most preferred is N-vinyl-2-pyrrolidone.

Alternatively, in place of or in addition to the N-vinyl lactams, i.e., N-vinyl cyclic amides, open chain N-vinyl amides can also be suitable for use in the present invention. Open chain N-vinyl lactams are described by the formula of (R)(R)C=(R)—N(R)—C(O)—$(Y)_m$—R where R, Y, and m are the same as those disclosed above. The preferred open chain N-vinyl amide is N-methyl-N-vinylacetamide.

The minimum amount of N-vinyl lactam comonomer required is that amount necessary to provide the desired polymer properties, such as fluid loss control under the subterranean conditions. For example, polymers containing a minor amount, up to about 10 weight percent, of the vinyl lactam can be effective in the recovery and processing of natural resources, such as, for example, in enhanced oil recovery in reservoirs having temperatures in the range of about 25° C. to about 70° C. and/or formation waters of significant salinity and/or hardness. Polymers of these proportions can also be useful under more adverse conditions if exposed for shorter periods of time.

The monomer weight ratios of the copolymers can vary rather widely. Generally, the weight ratios of the vinyl lactam to unsaturated amide in the range from about 1:99 to about 99:1 can be employed depending upon the intended application, but preferably weight ratios in the range of about 5:95 to about 95:5 are employed, more preferably from about 10:90 to about 90:10. The optimum weight may vary according to the application.

The term "vinyl acid" denotes a molecule that contain an ethylenic linkage and an acid functionality or an ammonium or alkali metal salt thereof. Suitable vinyl acid can have the formula of (R)(R)C=C(R)—C(O)—$(G)_m$—$(Y)_m$—W in which G is N(R) or O; R, Y, and m are the same as those disclosed above; W is an acid moiety selected from the group consisting of phosphonic acids, phosphoric acids, phosphinic acids, sulfuric acids, sulfonic acids, sulfurous acids, sulfinic acids, carboxylic acids, alkali metal salts of the acids, ammonium salts of the acids, and combinations of two or more thereof.

Examples of suitable vinyl acids include, but are not limited to, 2-acrylamido-2-methylpropane sulfonic acid, ammonium salt or alkali metal salts of 2-acrylamido-2-methylpropane sulfonic acid, 2-methacryloyloxyethane sulfonic acid, ammonium salt or alkali metal salts of 2-methacryloyloxyethane sulfonic acid, vinyl toluene sulfonic acid, ammonium salt or alkali metal salts of vinyl toluene sulfonic acids, vinylsulfonic acids, ammonium salt or alkali metal salts of vinylsulfonic acid, styrene sulfonic acid, ammonium salt or alkali metal salts of styrene sulfonic acid, and combinations of two or more thereof. The presently preferred vinyl acid are 2-acrylamido-2-methylpropane sulfonic acid, alkali metal salts of 2-acrylamido-2-methylpropane sulfonic acid, or combinations of two or more thereof.

The presently preferred polymers are copolymers of N-vinyl-2-pyrrolidone and acrylamide, terpolymers of sodium 2-acrylamide-2-methylpropanesulfonate, acrylamide and N-vinyl-2-pyrrolidone, copolymers of sodium 2-acrylamido-2-methyl-2-propanesulfonate and acrylamide, and combinations of two or more thereof for applications in high salinity environments at elevated temperatures. Selected terpolymers also are useful in the present process, such as terpolymers derived from acrylamide and N-vinyl-2-pyrrolidone comonomers with lesser amounts of terrnonomers such as vinyl acetate, vinylpyridine, styrene, methyl methacrylate, and other polymers containing acrylate groups. Generally, the mole percent of acrylamide is in the range of from about 15 to about 90%, preferably about 20 to about 85%, and most preferably 20 to 80%.

Additional repeat units can include, but are not limited to, vinyl acetate, alkyl esters of ethylenically-unsaturated monocarboxylic acids having from 3 to about 22 carbon atoms, such as ethyl acrylate, and ethylenically-unsaturated nitriles having from 3 to about 5 total carbon atoms, such as acrylonitrile, N-vinyl acetamide, and 2-vinyl quinoline. Also suitable are acryloylpiperazine, methacryloylpiperazine, methacryloylmorpholine, acryloyl pyrrolidones, diacetoneacrylamide, N- and N,N-alkylacrylamides where the alkyl groups contain more than two carbon atoms, vinyl pyridines such as 4-vinyl pyridine, acryloyl morpholine, methyl vinyl ether, ethyl vinyl ether, dimethylallyl ammonium chloride, dimethylaminoethyl acrylate, N-vinyl urea, acryloyl urea, N,N-diethylaminoethyl acrylamide, N-methyol acrylamide, tertbutylaminoethyl acrylate, dimethylaminopropyl metbacrylamide, methacrylamidopropyl trimethyl ammonium chloride, and hydroxyalkyl esters of ethylenically-unsaturated monocarboxylic acids having from 3 to about 22 carbon atoms, such as hydroxyethyl acrylate, (meth)acrylic acids and their monovalent salts and their esters such as methyl acrylate, butyl acrylate, methyl methacrylate and lauryl methacrylate, acrylonitrile, diacetone acrylamide, styrene, vinyl pyridines, hydroxypropyl methacrylate, hydroxyethyl methacrylate, hydroxyethyl acrylate, and combinations of two or more thereof The polymers disclosed in the present invention can be produced by solution, emulsion, reverse emulsion (water-in-oil) or slurry polymerization processes. Because these process are well known to one skilled in the art, the description of which is omitted herein for the interest of brevity.

When the additive composition is used in a water-based fluid, the water-based fluid composition can contain the polymer disclosed above in the range of from about 0.01 to about 10, preferably from about 0.05 to about 5, and most preferably from 0.1 to 3 weight %.

According to the second embodiment of the present invention, a composition is provided which comprises, or consists essentially of, calcium chloride, a polymer, and water. The scope of the polymer is the same as that disclosed in the first embodiment of the invention.

The composition can be made by a variety of mixing means known to one skilled in the art such as, for example, blending. The individual components can be mixed in any order. Because such mixing means are well known to one skilled in the art, the description is omitted herein for the interest of brevity.

The term "water" can be a pure water, a regular tap water, a solution, a suspension, or combinations of any two or more thereof wherein the solution or suspension contains dissolved, partially dissolved, or undissolved substances. The substances can be salts, clays, solid particles, other polymers, or combinations of two or more thereof.

Examples of salts that can be present in a water-based fluid using the composition of the invention include, but are not limited to, alkali metal halides, alkaline earth metal halides, and combinations of any two or more thereof. Generally the total salts content in the water-based composition can vary widely from, for example, 5 to as high as 50 weight %. The typical total salts content can be in the range of from, for example, about 5 weight % to about 40 weight %.

Examples of suitable clays include but are not limited to kaolinite, halloysite, vermiculite, chlorite, attapulgite, smectite, montmorillonite, illite, saconite, sepiolite, palygorskite, Fuller's earth, and combinations of any two or more thereof. The presently preferred clay is palygorskite which is also known as attapulgite because it works well in drilling fluids. The clay can be present in the water in the range of from about 0.25 weight % to about 15 weight %, preferably about 0.5 weight % to about 10 weight %, and most preferably 1 weight % to 5 weight %.

A polysaccharide can also be used in a water-based fluid composition. Suitable polysaccharides for use in the composition are those capable of increasing the viscosity, or controlling the water loss, or both, of the composition in aqueous form and include, but are not limited to, starches, gums, other biopolysaccharides, celluloses, and combinations of any two or more thereof.

Examples of suitable celluloses are those selected from the group consisting of carboxymethylcellulose, methylcellulose, carboxymethyl hydroxyethyl cellulose, hydroxypropyl methylcellulose, hydroxypropyl cellulose, hydroxyethyl cellulose, ethylhydroxy cellulose, and combinations of any two or more thereof.

Examples of suitable starches include those selected from the group consisting of carboxymethyl starch, hydroxyethyl starch, and hydroxypropyl starch, and combinations of any two or more thereof.

Examples of suitable gums are those selected from the group consisting of arabic, trajacanth, karaya, shatti, locust bean, guar, psyllium seed, quince seed, agar, algin, carrageenin, furcellaran, pectin, gelatin, and combinations of any two or more thereof.

The biopolysaccharides useful in this invention are biopolymers produced by a process comprising the microbial transformation of a carbohydrate with a microorganism to obtain a polymeric material which differs from the parent polymeric material in respect of composition, properties and structure. These are thoroughly discussed in U.S. Pat. No. 5,091,448, which is incorporated herein by reference.

Additionally, a polypropylene or polyethylene glycol can also be used in the present water-based fluid composition. Polypropylene or polyethylene glycols are commercially available glycol-based polymers. A polypropylene glycol is the product of a propylene oxide polymerization. Generally, a suitable polypropylene glycol can have a molecular weight in the range of from about 400 to about 7,500, preferably about 1,000 to about 6,000, more preferably about 1,200 to about 5,000, and most preferably 1,500 to 4,500. Furthermore, the polypropylene glycol polymer useful in the invention can also be a polypropylene glycol having one or more methyl groups attached to the propylene units of the polymer.

The weight percent of the individual components of the water-based fluid composition, according to the second embodiment of the present invention, can be any weight percent so long as the additive composition can increase the viscosity, or control the water loss, or inhibit the drill solids, or combinations of any or more thereof, of a water-based fluid and can vary widely depending on the desired applications. Generally the water-based fluid composition of the present invention can contain calcium chloride in the range of from about 10,000 to about 500,000, preferably from about 25,000 to about 400,000, more preferably from about 50,000 to about 350,000, even more preferably from about 100,000 to about 300,000, and most preferably from 150,000 to 250,000 mg/l; the polymer in the range of from about 0.01 to about 10, preferably from about 0.05 to about 5, and most preferably from 0.1 to 3 weight %; the polypropylene glycol polymer, if present, is present in the range of from about 0.01 to about 20, preferably from about 0.05 to about 15, and most preferably from 0.1 to 10 weight %; and the polysaccharide, if present, is in the range of from about 0.01 to about 10, preferably from about 0.05 to about 5, and most preferably from 0.1 to 3 weight %. Water makes up the rest of the composition.

According to the third embodiment of the present invention, a process for treating subterranean formations comprises contacting the formation with a composition which comprises, or consists essentially of, calcium chloride, a polymer and water. The scope of the polymer is the same as that disclosed in the first embodiment and/or the second embodiment of the invention.

The weight percent of the individual components of the composition used in the third embodiment of the present invention can also be the same as that disclosed above.

The additive and/or water-based fluid composition can be used in well treating, drilling, workover, or completion fluids in oil field operations by those skilled in the art. Generally, the liquid additive composition can be used in any drilled wells having a temperature in the range of from about 10° C. to about 260° C., preferably 25° C. to 200° C.

The following specific examples are intended to illustrate the advantages of the present invention and are not intended to unduly limit the scope of the invention.

EXAMPLE I

This example illustrates that the copolymers disclosed in the present invention exhibits very good fluid loss control in a $CaCl_2$ water-based fluid.

A 10 ppg (pounds per gallon) $CaCl_2$ brine was prepared by dissolving $CaCl_2$ salt in tap water. The $CaCl_2$ brine was cooled to about 21° C. Using a Multimixer, 32 grams of attapulgite clay was mixed with 1120 ml of the $CaCl_2$ brine for 20 minutes to produce a base mud. This base mud was used for preparing the following sample in quart jars: sample 1A: 280 ml of base mud+3.4 grams of 50:50 (weight %) acrylamide (AM): sodium-2-acrylamido-2-methanesulfonate (Na-AMPS®) (mixed for 20 minutes on the Multimixer); sample 1B: 280 ml of base mud+3.4 grams of 50:50 (weight %) AM:N-vinyl-2-pyrrolidone (NVP) copolymer (mixed for 20 minutes); sample 1C: 280 ml of base mud+3.4 grams of 65:35 (weight %) AM:NVP copolymer (mixed for 20 minutes). The copolymer was mixed into the base mud samples while the samples were being stirred on the Multimixer. After rolling for about 2 hours in an 80° C. oven and then cooling to 18° C., these samples were mixed for 10 more minutes with the Multimixer, defoamed by adding about 0.05 ml of octyl alcohol, and tested immediately according to the procedures in API RP 13B-1. Thereafter, the samples were aged for 16 hours in an oven at 121° C. After cooling to 24° C., the samples were again mixed for 5 minutes, defoamed, and retested. The results are shown in Table 1.

TABLE 1[a]

| | Results After Rolling 2 Hours at 80° C. | | | Results After 16 Hours at 121° C. | | |
|---|---|---|---|---|---|---|
| Sample | PV/YP | Gels | Fluid Loss | PV/YP | Gels | Fluid Loss |
| 1A | 24/48 | 2/3 | 67.8 | 21/11 | 1/2 | 68.6 |
| 1B | 37/28 | 3/4 | 3.8 | 24/23 | 2/3 | 3.5 |
| 1C | 34/30 | 3/4 | 3.5 | 31/18 | 2/3 | 3.3 |

[a]PV, plastic viscosity, cps; YP, yield point, lbs/100 ft$^2$; Gels, lbs/100 ft$^2$; Fluid loss, ml/30 minutes.

As shown in Table 1, in the $CaCl_2$ water mud, samples containing copolymers of AM:NVP (samples 1B and 1C) provided much lower fluid loss than the same with the AM:Na-AMPS® copolymer (sample 1A). The lower the fluid loss is, the better the fluid is in drilling applications.

EXAMPLE II

This example shows that the copolymers of AM:NVP are ineffective for providing fluid loss control in a sea water-based drilling mud.

A sea water-based mud was prepared by mixing 32 grams of bentonite clay, 3.2 grams of sodium lignite (Super Treat lignite from American Colloids), 1.0 ml of 50% (weight/volume) NaOH solution, and 23.5 grams of "Sea Salt" ASTM D-1141-52 (Lake Products Co., Inc; Maryland Heights, Miss., USA) into 560 ml of tap water in a quart jar. While mixing the tap water with a Multimixer, the materials were added according to the order they are listed. The mixing was continued for a period of 10 minutes after each addition. This sea water mud was used for preparing the following samples: sample 2A: 150 g of sea water mud+147 ml of tap water+3 grams (on dry basis) of 90:10 (weight %) Na-AMPS®:NVP copolymer (mixed for 20 minutes on the Multimixer)+4 grams of sodium lignite (mixed for 10 minutes)+250 grams of barite (mixed for 20 minutes)+10 grams of bentonite clay as drill solids (mixed for 20 minutes); sample 2B: same as sample 2A except 3 grams (on dry basis) of 50:50 (weight %) AM:NVP copolymer was mixed in place of the 90:10 copolymer; same 2C: same as sample 2A except 3 grams (on dry basis) of 65:35 (weight %) AM:NVP copolymer was mixed in place of the 90:10 copolymer.

These samples were tested initially at 38° C. according to the procedures in API RP 13B-1. They were then rolled for about 2 hours in an oven at 80° C., cooled, and retested at 38° C. after mixing for 5 minutes on the Multimixer. The test results are shown in Table II.

TABLE II[a]

| | Initial Results | | | Results After Rolling 2 Hours at 80° C. | | |
|---|---|---|---|---|---|---|
| Sample | PV/YP | Gels | Fluid Loss | PV/YP | Gels | Fluid Loss |
| 2A | 59/35 | 29/54 | Not Tested | 59/33 | 23/46 | 4.2 |
| 2B | 33/136 | 39/48 | Not Tested | 34/157 | 42/39 | >200 |
| 2C | 56/70 | 20/36 | Not Tested | 67/137 | 29/32 | >200 |

[a]See footnote a in Table I.

As shown in Table II, the copolymers of AM:NVP are ineffective for providing fluid loss control in a sea water mud. Surprisingly, as shown in Example I, these copolymers are very effective in a $CaCl_2$ water mud.

EXAMPLE III

This example demonstrates that the polymer disclosed in the present invention performs better than a copolymer of AM and Na-AMPS®.

Terpolymers of AM, Na-AMPS®, and NVP were used in the following tests. The following fluid samples were prepared in quart jars: Sample 3A: 350 ml of 9.6 ppg $CaCl_2$ water+5 g attapulgite clay (mixed for one hour on a Multimixer)+0.5 g PPG 4000 (polypropylene glycol obtained from Dow Chemical Company, Midland, Mich.; mixed for 30 minutes)+3 grams of 50:50 (weight %) AM:Na-AMPS® copolymer (mixed for 30 minutes)+1 gram of Flowzan® xanthan gum (obtained from Phillips Petroleum Company, Bartlesville, Okla.; mixed for 30 minutes)+15 grams of bentonite clay as drill solids (mixed for 15 minutes); sample 3B: same as sample 3A except 3 grams of 50:45:5 (weight %) AM:Na-AMPS®:NVP terpolymer was mixed in place of the 50:50 copolymer; sample 3C: same as sample 3A except 3 grams of 50:40:10 (weight %) AM:Na-AMPS®:NVP terpolymer was mixed in place of the 50:50 copolymer.

All samples were rolled 2 hours in a roller oven that was heated at 66° C., cooled to about 38° C., mixed 5 minutes, and tested according to the procedures in API RP 13B-1. They were then static aged 16 hours in an oven at 121° C. and, after cooling to about 32° C. and mixing 5 minutes, retested. The results are presented in Table III.

TABLE III[a]

| | Results After Rolling at 66° C. | | | Results After Static Aging at 121° C. | | |
|---|---|---|---|---|---|---|
| Sample | 600/300[b] | Gels | Fluid Loss | 600/300[b] | Gels | Fluid Loss |
| 3A | 68/50 | 8/11 | 6.8 | 52/36 | 4/5 | 21.8 |
| 3B | 75/55 | 8/10 | 5.2 | 54/38 | 4/5 | 7.1 |
| 3C | 75/54 | 7/10 | 4.8 | 52/36 | 3/4 | 6.5 |

[a]See footnote a in Table I.
[b]Readings in this column refer to the readings of a direct-indicating 115-volt motor-driven viscometer (API RP 13B-1, June 1, 1990, Section 2-4a) at 600/300 rpm, respectively.

As shown in the above Table III, samples containing terpolymers (same 3B and 3C) provided lower (better) fluid loss than sample 3A.

EXAMPLE IV

This examples show that the polymer disclosed in the present invention provides much better fluid loss control than a copolymer of AM and Na-AMPS® in a $CaCl_2$ brine which contains only attapulgite clay.

Using a dispersator, 10 ppg $CaCl_2$ brine was prepared by dissolving $CaCl_2$ salt in tap water. The $CaCl_2$ brine was kept at about 24° C. for about 2 hours. After removing insoluble impurities from the $CaCl_2$ brine, 32 grams of attapulgite clay was mixed with 1120 ml of clear $CaCl_2$ brine at about 10,000 RPM for one hour to produce a base mud. This base mud was cooled to about 24° C. and, after shaking well, it was used for preparing the following samples in quart jars. Sample 4A: 350 ml of base mud (mixed for 20 minutes on a Multimixer); sample 4B: 350 ml of base mud+4 grams (on dry basis) of 50:50 (weight %) AM:Na-AMPS® copolymer (mixed for 20 minutes); sample 4C: 350 ml of base mud+4 grams (on dry basis) of 50:40:10 (weight %) AM:Na-AMPS®:NVP terpolymer (mixed for 20 minutes). After being kept for about 2 hours at 24° C., these samples were mixed 20 more minutes on the Multimixer. They were defoamed by adding about 0.05 ml of octyl alcohol and tested immediately according to the procedures in API RP 13B-1. They were then rolled for 16 hours in a roller oven at around 52° C. After cooling them to 27° C., they were shaken vigorously with a spatula for about 30 seconds and retested. The results are shown in Table IV.

TABLE IV[a]

| | Results After 2 Hours at 24° C. | | | Results After 16 Hours at 52° C. | | |
|---|---|---|---|---|---|---|
| Sample | 600/300 | Gels | Fluid Loss | 600/300 | Gels | Fluid Loss |
| 4A | 14/11 | 4/10 | 127.8 | 11/6 | 2/3 | 137.4 |
| 4B | 55/35 | 2/2 | 94.5 | 57/36 | 2/3 | 123.2 |
| 4C | 84/55 | 3/4 | 9.1 | 90/58 | 3/4 | 9.0 |

[a]See footnotes a and b in Table III.

As shown in Table IV, the base mud containing the terpolymer (same 4C) gave much lower (better) fluid loss than the base mud and the base mud which contained the copolymer (sample 4A and 4B, respectively).

EXAMPLE V

This example also shows that the polymer disclosed in the present invention exhibits good fluid loss control in a $CaCl_2$ water-based mud which contains hydroxyethyl cellulose (HEC) for fluid loss control Using a dispersator, 10 ppg $CaCl_2$ brine was prepared by dissolving $CaCl_2$ salt in tap water. The $CaCl_2$ brine was kept at about 24° C. for about 2 hours. After removing insoluble impurities from the $CaCl_2$ brine, 16 grams of attapulgite clay was mixed with 1120 ml of clear $CaCl_2$ brine at about 10,000 RPM for 30 minutes. Next, 1.6 grams of HEC polymer (Type 99-210 HHW obtained from Aqualon Company, Hopewell, Va.) from Aqualon was mixed and mixed for another 30 minutes to produce a base mud. This base mud was defoamed by addition of 0.05 ml of octyl alcohol and then used for preparing the following samples in quartjars. Sample 5A: 350 ml of base mud (mixed for 20 minutes on a Multimixer); sample 5B: 350 ml of base mud+3 grams (on dry basis) of 50:50 (weight %) AM:Na-AMPS® copolymer (mixed for 20 minutes); sample 5C: 350 ml of base mud+3 grams (on dry basis) of 50:40:10 (weight %) AM:Na-AMPS®:NVP terpolymer (mixed for 20 minutes). After being kept for about 4 hours at 24° C., these sample were mixed for 20 more minutes on the Multimixer. Then 10 grams of bentonite clay was mixed with each sample and all samples were mixed for 20 more minutes. After being defoamed by addition of about 0.05 ml of octyl alcohol, these samples were tested immediately according to the procedures in API RP 13B-1. The samples were then transferred into 400 ml stainless steel cells and the cells were rolled for 16 hours in a roller oven at around 121° C. After cooling them to about 27° C., the samples were transferred back to quart jars and then mixed 5 minutes on the Multimixer. They were defoamed immediately with 0.05 ml of octyl alcohol and retested. The results are shown in Table V.

TABLE V[a]

| | Results After 4 Hours at 24° C. | | | Results After 16 Hours at 121° C. | | |
|---|---|---|---|---|---|---|
| Sample | 600/300 | Gels | Fluid Loss | 600/300 | Gels | Fluid Loss |
| 5A | 14/7 | 1/1 | 21.8 | 9/5 | 1/1 | 51.2 |
| 5B | 46/28 | 1/1 | 5.2 | 22/12 | 1/1 | 5.7 |
| 5C | 52/31 | 1/1 | 4.6 | 26/14 | 1/1 | 4.5 |

[a]See footnotes a and b in Table III.

Results in Table V show that, in the presence of HEC as a fluid floss control additive, samples containing the copolymer and terpolymer (samples 5B and 5C) gave much lower fluid loss than the base mud (sample 5A). The sample containing the terpolymer (sample 5C) gave the lowest (best) fluid loss.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising calcium chloride, water, a clay, and a polymer having repeat units derived from an unsaturated amide having the formula of (R)(R)C=C(R)—$(Y)_m$—C(O)—N(R)(R), a vinyl lactam having the formula of

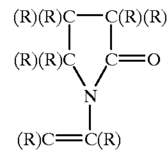

and a vinyl acid having the formula of (R)(R)C=C(R)—C(O)—$(G)_m$—$(Y)_m$—W;

wherein each R is independently selected from the group consisting of hydrogen, alkyl radicals aryl radicals, aralkyl radicals, alkalkyl radicals, cycloalkyl radicals, and combinations of two or more thereof wherein each radical contains 1 to about 12 carbon atoms;

wherein m is 0 or 1;

wherein Y is an alkylene radical having 1 to about 10 carbon atoms;

wherein G is N(R) or O;

wherein W is an acid moiety selected from the group consisting of phosphonic acids, phosphoric acids, phosphinic acids, sulfuric acids sulfonic acids, sulfurous acids, sulfinic acids, carboxylic acids, alkali metal salts of the acids, ammonium salts of the acids, and combinations of any two or more thereof;

wherein said polymer is present in a sufficient amount effective to control fluid loss of said composition; and wherein said calcium chloride is present in said composition in the range of from about 10,000 to about 500,000 mg/l.

2. A composition according to claim 1 wherein said calcium chloride is present in said composition in the range of from about 100,000 to about 300,000 mg/l.

3. A composition according to claim 2 wherein Y is an alkylene radical having 1 to 4 carbon atoms.

4. A composition according to claim 2 wherein said polymer comprises of a monomer selected from the group consisting of acrylamide, vinyl acetate, vinylpyridine, styrene, methyl methacrylate, acryloylpiperazine, methacryloylpiperazine, methacryloylmorpholine, methacrylamide, acrylonitrile, methacrylic acid, ammonium salt of methacrylic acid, alkali metal salts of methacrylic acid, 2-methacryloyloxyethyltrimethylamine, 2-acrylamido-2-methylpropane sulfonic acid, ammonium salts or alkali metal salts of 2-acrylamido-2-methylpropane sulfonic acid, 2-methacryloyloxyethane sulfonic acid, ammonium salts or alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, vinylsulfonic acids, ammonium salts or alkali metal salts of vinylsulfonic acid, styrene sulfonic acid, ammonium salts or alkali metal salts of styrene sulfonic acid, N-vinyl-2-pyrrolidone, and combinations of any two or more thereof.

5. A composition according to claim 2 wherein said polymer comprises of a monomer selected from the group consisting of acrylamide, 2-acrylamido-2-methylpropane sulfonic acid, alkali metal salts of 2-acrylamido-2-methylpropane sulfonic acid, N-vinyl-2-pyrrolidone, and combinations of two or more thereof.

6. A composition according to claim 2 wherein said polymer is a terpolymer of sodium 2-acrylamide-2-methylpropanesulfonate, acrylamide and N-vinyl-2-pyrrolidone.

7. A composition according to claim 1 wherein said composition further comprises dissolved salts, solid particles, and a second polymer, and combinations of two or more thereof.

8. A composition according to claim 1 wherein said clay is selected from the group consisting of kaolinite, halloysite, vermiculite, chlorite, attapulgite, smectite, montmorillonite, illite, saconite, sepiolite, palygorskite, Fuller's earth, and combinations of two or more thereof.

9. A composition according to claim 8 wherein said clay is attapulgite or bentonite.

10. A process comprising contacting a subterranean formation with a composition comprising calcium chloride water, a clay, and a polymer having repeat units derived from an unsaturated amide having the formula of (R)(R)C=C(R)—(Y)$_m$—C(O)—N(R)(R), a vinyl lactam having the formula of

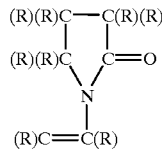

and a vinyl acid having the formula of (R)(R)C=C(R)—C(O)—(G)$_m$—(Y)$_m$—W;

wherein each R is independently selected from the group consisting of hydrogen, alkyl radicals, aryl radicals, aralkyl radicals, alkalkyl radicals, cycloalkyl radicals, and combinations of two or more thereof wherein each radical contains 1 to about 12 carbon atoms;

wherein m is 0 or 1;

wherein Y is an alkylene radical having 1 to about 10 carbon atoms;

wherein G is N(R) or O;

wherein W is an acid moiety selected from the group consisting of phosphonic acids, phosphoric acids, phosphinic acids, sulfuric acids, sulfonic acids, sulfurous acids, sulfinic acids, carboxylic acids, alkali metal salts of the acids, ammonium salts of the acids, and combinations of any two or more thereof;

wherein said polymer is present in a sufficient amount effective to control fluid loss of said composition; and wherein said calcium chloride is present in said composition in the range of from about 10,000 to about 500,000 mg/l.

11. A process according to claim 10 wherein said polymer is a terpolymer of sodium 2-acrylamide-2-methylpropanesulfonate, acrylamide and N-vinyl-2-pyrrolidone.

12. A process according to claim 11 wherein said clay is selected from the group consisting of kaolinite, halloysite, vcrmiculite, chlorite, attapulgite, smectite, montmorillonite, illite, saconite, sepiolite, palygorskite, Fuller's earth, and combinations of two or more thereof.

* * * * *